UNITED STATES PATENT OFFICE.

MAXIMILIAN CARL LUDWIG ALTHAUSSE, OF BILLWÄRDER-AN-DER-BILLE, NEAR HAMBURG, GERMANY, ASSIGNOR TO FIRM OF FABRIK CHEMISCHER PRÄPARATE VON DR. RICHARD STHAMER, OF HAMBURG, GERMANY.

PROCESS OF MAKING ACETYL-CELLULOSE.

SPECIFICATION forming part of Letters Patent No. 692,497, dated February 4, 1902.

Application filed December 12, 1901. Serial No. 85,691. (No specimens.)

*To all whom it may concern:*

Be it known that I, MAXIMILIAN CARL LUDWIG ALTHAUSSE, a subject of the German Emperor, and a resident of Billwärder-an-der-Bille, near Hamburg, in the German Empire, have invented certain new and useful Improvements in the Production of Acetyl Derivates of Hydrocellulose, of which the following is a specification.

In the specification of my prior United States Patent No. 679,204, dated July 23, 1901, I have described a process by means of which cellulose may be converted into hydrocellulose, which process consists in treating crude cellulose with glacial acetic acid containing free chlorin and heating the same while being stirred to from 60° to 70° centigrade. From the hydrocellulose thus obtained acetyl derivates may be produced by treating the said hydrocellulose in the following manner: About one hundred parts, by weight, of hydrocellulose are mixed with about three hundred and fifty parts, by weight, of glacial acetic acid and to this mixture added about three hundred and fifty parts, by weight, of acetyl chlorid, which has for its result an energetic reaction in which hydrochloric acid is split off and considerable heat developed. As soon as the reaction ceases a small quantity of concentrated sulfuric acid is added to the mixture and the latter thoroughly mixed and heated to from 60° to 70° centigrade. The splitting off of the hydrochloric acid continues, and this has for its result the formation of a thick pulp, which is kept for a short period of time at a temperature of from 65° to 70° centigrade until the said mass has lost its pulpy character. From this reaction product, which is now in a liquid state, the acetyl hydrocellulose is precipitated by means of water, obtaining thereby an acetyl derivate which is soluble in acetone and alcohol, but cannot be precipitated therefrom with water even when the solution is considerably diluted with water. The acetyl derivate obtained by evaporating a solution thereof is also insoluble in water. It is, however, possible to separate the whole of the acetyl derivate even from highly-diluted solutions by salting it out with a comparatively small amount of common salt.

The acetyl-cellulose derivates possess properties which are of the utmost importance for technical purposes, among others, for instance, for the production of splendid lakes. In producing lakes a solution of the acetyl-cellulose in alcohol, for instance, is dyed with a suitable dye or coloring-matter. It is then diluted with water and finally salted out by adding a small quantity of finely-pulverized common salt. As the acetyl-cellulose in a humid or moist state is very voluminous, a copious precipitate can be obtained even from a highly-diluted solution. The lakes thus obtained possess, in contradistinction to the lakes precipitated by means of metallic salts, the advantage of being absolutely insoluble in water after drying, of being transparent or nearly transparent when applied in a thin layer, and of showing a fresh sparkling color.

The property of the acetyl derivates to produce in combination with coloring-matters insoluble lakes gives the said derivates a high value as dyes or for printing fabrics, such as cloth, or for color-printing on paper. When fabrics are first treated with an alcoholic or aqueous alcoholic solution of the acetyl-cellulose above described and are then treated with a suitable coloring-matter or dye, a better diffusion or distribution of the color on the fibers is obtained, and the fibers retain the color more firmly.

Concentrated alcoholic solutions of the above-described acetyl-cellulose when dyed with artificial coloring-matters are well adapted for printing on paper.

I do not claim herein the use of the acetyl derivates of cellulose for the production of coloring-matter, as this forms the subject-matter of another application, Serial No. 70,260, filed July 30, 1901.

Having thus described my invention, what I claim as new therein, and desire to secure by Letters Patent, is—

1. The process which consists in reacting on hydrocellulose with glacial acetic acid and acetyl chlorid at a suitable temperature and upon the reaction product with sulfuric acid, for the purpose set forth.

2. The process which consists in reacting on hydrocellulose with glacial acetic acid and acetyl chlorid at a suitable temperature and upon the reaction product with sulfuric acid, liquefying the resultant product by heat and separating the acetyl derivate of hydrocellulose from its liquid constituents, for the purpose set forth.

3. The process which consists in reacting upon hydrocellulose with glacial acetic acid and acetyl chlorid at a suitable temperature, and upon the reaction product with sulfuric acid at a temperature of from 60° to 70° centigrade, maintaining this temperature until the resultant product is liquefied and precipitating the acetyl derivate of hydrocellulose by means of water.

MAX. CARL LUDWIG ALTHAUSSE.

Witnesses:
MAX KACURPFF,
E. H. L. MUMMENHOFF.